United States Patent [19]

Baker

[11] 3,951,072

[45] Apr. 20, 1976

[54] PROPELLANT GRAIN
[75] Inventor: Roland E. Baker, China Lake, Calif.
[73] Assignee: The United States of America as represented by the Secretary of the Navy, Washington, D.C.
[22] Filed: Sept. 12, 1968
[21] Appl. No.: 761,011

[52] U.S. Cl. ................................ 102/99; 60/253
[51] Int. Cl.² ................................... F02K 9/04
[58] Field of Search ............... 60/35.6 RS, 253; 102/99, 49.3–49.7

[56] References Cited
UNITED STATES PATENTS 3,088,273   5/1963   Adelman et al. .............. 60/35.6 RS
3,407,736   10/1968  Beuschel ............................ 102/99

Primary Examiner—Verlin R. Pendegrass
Attorney, Agent, or Firm—R. S. Sciascia; Roy Miller; Gerald F. Baker

[57] ABSTRACT

A hollow propellant grain with an aft end section having a greater web thickness than the forward end to prevent damage to the aft end of the motor housing without the usual heavy insulation.

4 Claims, 3 Drawing Figures

U.S. Patent   April 20, 1976   3,951,072
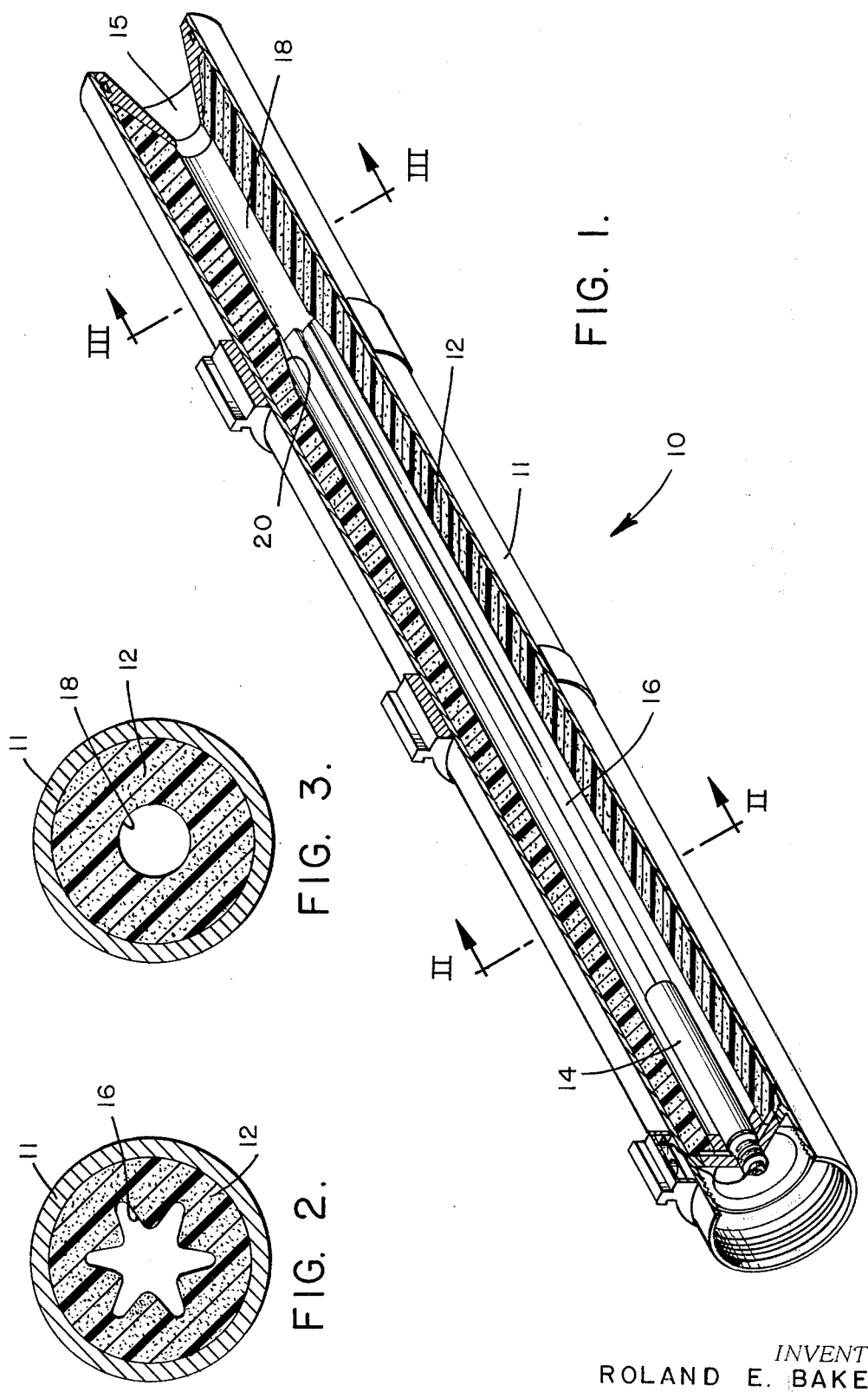
INVENTOR.
ROLAND E. BAKER
BY ROY MILLER
ATTORNEY.
GERALD F. BAKER
AGENT.

PROPELLANT GRAIN

BACKGROUND OF THE INVENTION

Propellant grains formerly have been of uniform cross sectional configuration throughout the length of the grain. These former propellant grains burned with excessive erosion of the after end resulting in an uneven power output and eventually burning the motor tube itself. When insulation has been used to prevent damage to the casing, the space available for propellant has thus been reduced and the fuel-to-weight ratio has likewise been reduced.

According to the present invention, a propellant grain is formed with a novel cavity configuration resulting in improved burning with more even power distribution and eliminating the need for heavy insulation of the after end of the motor.

BRIEF DESCRIPTION OF THE DRAWING

FIG. 1 is a perspective view, partially in section, showing a propellant grain according to the present invention;

FIG. 2 is a cross sectional view taken along line 2 — 2 of FIG. 1; and

FIG. 3 is a cross sectional view taken along line 3 — 3 of FIG. 1.

DESCRIPTION OF THE PREFERRED EMBODIMENT

As shown in FIG. 1, a rocket motor 10 comprises a tube 11 having inserted therein a propellant grain 12. The forward end of the propellant grain 12 is fitted with an igniter 14. When ignited, the propellant exhausts burning gases through a nozzle 15 at the after end of tube 11. As shown in FIGS. 2 and 3, the inner surface of propellant grain 12 varies from a star configuration at the forward end, as shown in FIG. 2, down to the circular configuration indicated at 18 in FIG. 3.

The walls of the grain at 18 are thicker than the walls of the forward portion measured from the bottom of the grooves but not quite as thick as the maximum thickness of the lands. In other words, the circle formed by the internal boundary of a cross section of the after end is concentric with circles joining the respective vertices of the lands and grooves and is intermediate thereto.

The cavity walls are smoothly tapered at 20, fore to aft, to achieve this configuration and the casting of the grain, therefore, is no problem. The propellant is easily cast, for example, by conventional casting methods. Such a grain burns along the entire internal surfaces. The gases passing through the cylindrical portion 18 of the grain may still erode the propellant but, since the cylindrical portion of the grain provides a greater web thickness and a slightly reduced burning area, it is found that the grain burns more smoothly and damage to the casing is prevented.

The possibility of damage to the casing is eliminated to such an extent that heavy insulation is unnecessary and, therefore, increased volumetric loading is possible in direct proportion to the amount of insulation eliminated.

What is claimed is:

1. An improved propellant grain comprising:
    an elongated solid propellant material having a central cavity;
    said central cavity having a forward initiation section and an after end section;
    said forward section having a cross sectional configuration characterized by a plurality of lands and grooves;
    said after end section having a cross section of circular configuration;
    the vertices of said lands and said grooves defining, respectively, two concentric circles; and the circle formed by the internal boundary of a cross section of the after end is concentric to said two concentric circles and intermediate thereto.

2. The propellant grain of claim 1 wherein the circular cross sectional portion of said cavity comprises approximately one-fourth of the length of said cavity and the cavity walls are connected by an evenly tapered portion from the irregular forward section to the circular end section.

3. The propellant grain of claim 1 wherein said circle formed by the internal boundary of a cross section of the after end has a much larger diameter than the circle joining the vertices of said grooves and only slightly smaller than the circle joining the vertices of said lands.

4. The propellant grain of claim 2 wherein said circle formed by the internal boundary of a cross section of the after end has a much larger diameter than the circle joining the vertices of said grooves and only slightly smaller than the circle joining the vertices of said lands.

* * * * *